United States Patent [19]
Rodriguez-Cavazos

[11] Patent Number: 5,258,903
[45] Date of Patent: Nov. 2, 1993

[54] CONTROL CIRCUIT AND POWER SUPPLY FOR TELEVISIONS

[75] Inventor: Enrique Rodriguez-Cavazos, Indianapolis, Ind.

[73] Assignee: Thomson Consumer Electronics, Indianapolis, Ind.

[21] Appl. No.: 807,358

[22] Filed: Dec. 16, 1991

[51] Int. Cl.$^5$ .................. H02M 3/335; H04N 5/21
[52] U.S. Cl. ................... 363/21; 395/902; 315/411
[58] Field of Search ......... 395/902, 907; 315/411; 358/190; 363/21

[56] References Cited

U.S. PATENT DOCUMENTS

| | | | |
|---|---|---|---|
| 3,836,734 | 9/1974 | Campanella et al. | 179/170.2 |
| 4,321,686 | 3/1982 | Horna | 364/724 |
| 4,425,612 | 1/1984 | Bahler et al. | 363/21 |
| 4,536,700 | 8/1985 | Bello et al. | 323/285 |
| 4,809,150 | 2/1989 | Limuti et al. | 363/21 |
| 4,873,661 | 10/1989 | Tsividis | 364/807 |
| 4,874,963 | 10/1989 | Alspector | 307/201 |
| 5,161,014 | 11/1992 | Pearson et al. | 358/160 |

OTHER PUBLICATIONS

Hsu et al., IEEE Transactions on Energy Conversion vol. 6, No. 4, pp. 612–619 (Inspec Abstract No. B9204–8110B–060)(Dec. 1991).

"Software 'Doctor' prescribes remedies," Wallich, IEEE Spectrum Oct. 1986, p. 43.

Reprint from AI Expert, The Magazine of Artificial Intelligence, "Neural Networks Primer", Maureen Caudill, Chapt. III, Backpropagation Network, Miller Freeman Publications, reprinted 1990.

Primary Examiner—Steven L. Stephan
Assistant Examiner—Ben M. Davidson
Attorney, Agent, or Firm—Joseph S. Tripoli; Eric P. Herrmann; Ronald H. Kurdyla

[57] ABSTRACT

An adaptive feed forward control circuit and power supply for a television comprises a circuit for supplying energy from a source to a load, the load having energy requirements which vary in response to an input signal, for example a video signal. A feedback circuit generates a first correction signal indicative of a difference between an operating voltage or current level and a reference level. A neural network generates a second correction signal indicative of anticipated energy requirement variation by processing information in present values of the input signal. A control circuit, for example a pulse width modulating circuit, is responsive to the correction signals for controlling operation of the energy supplying circuit. The first and second correction signals are combined by a summing circuit. The neural network comprises a first signal adaptive circuit for the input signal and a second signal adaptive circuit for a processed version of the input signal. The processed input signal is linearly independent of the input signal to avoid redundancy in the weight factors. The square root of the input signal, for example, is appropriate for a switched mode power supply. The combination of outputs from the first and second signal adaptive circuits defines the second correction signal. A microprocessor can embody the neural network and provide the processed version of the input signal. The microprocessor can also embody the feedback circuit. The predictive correction signal can be adjusted responsive to the size and polarity of the energy requirement variation.

26 Claims, 4 Drawing Sheets

CONTROL CIRCUIT AND POWER SUPPLY FOR TELEVISIONS

BACKGROUND OF THE INVENTION

This invention relates to the field of regulated electrical power supplies and associated control circuits, especially for television apparatus, and more particularly to a regulated electrical power supply wherein periodic and transitory changes affecting loading are sensed, adaptively correlated to their anticipated effect on loading, and used to vary the present output of the power supply to compensate before a variation appears on the output of the power supply, resulting in improved voltage regulation.

Electrical power supplies include, for example, means for converting an input voltage, which may be alternating current in a rectifying power supply, or direct current in a DC-DC supply or inverter, to an output voltage. Typically, a nominally constant DC voltage is desired, notwithstanding current variations. Whereas the power supply has an internal resistance and the current drawn from the supply by one or more electrical loads normally varies with periodic and/or transitory occurrences, the power supply is regulated such that the output voltage remains constant even though the current passing into the load varies. Such regulation is discussed herein with reference to a constant voltage, variable current power supply; however, the same considerations are applicable to constant current, variable voltage supplies as well.

In a typical voltage regulated power supply the present output voltage is sensed and compared to a reference defining a desired output voltage. For example, a differential amplifier has inputs coupled to the output voltage and to a constant voltage reference such as a reverse biased Zener diode. The output of the differential amplifier varies as a function of the difference between the present output level and the desired reference output level, and is known as the error signal or correction signal. The error signal represents the regulation error of the power supply and is used to control the delivery of energy from the input of the power supply to the output, that is, to the loads. In this manner, the power supply seeks to maintain or regulate the output for constant voltage regardless of variations in current with changes in loading. The same sort of technique is applied in a constant current power supplies to maintain a particular regulated current level regardless of changes in loading.

An element of the regulated power supply is responsive to the error signal from the differential amplifier to control the voltage and/or current applied to the output stages of the power supply. In a conventional switched mode power supply often used in television sets, as shown for example in FIG. 3, the output error signal $V_e$ from differential amplifier 201 is coupled to a pulse width modulator 202 to control the amount of energy applied to the primary side of transformer 203. Amplifier 201 typically has an input impedance $Z_i$ and a feedback loop impedance $Z_f$. Transistor 204 switches current on the primary side, at input voltage $V_{in}$, from input voltage source 205. The output at the secondary side of the transformer 203 can be rectified and filtered using diode 206 and capacitor 207 or the like, to produce regulated output voltage $V_{out}$. The regulated output is applied to the various loads coupled to the supply, indicated generally as load 210. This regulated output voltage is also coupled to the input of the differential amplifier 201, forming a feedback loop.

An inherent problem with a regulated power supply of the type shown in FIG. 3 is that in the event of a change in loading, a change in the output voltage $V_{out}$ must actually occur before any change in the application of energy to the primary side of transformer 203 can occur. Because the error voltage is generated by sensing the present level of output $V_{out}$, when either the input voltage $V_{in}$ changes, or the current drawn by the load 210 changes, the output voltage must vary from the nominal output defined by $V_{ref}$ before a correction can be made in the amount of energy coupled from the input of the power supply to the output.

The magnitude of the variation in the level of output $V_{out}$ from nominal which occurs in a feedback regulated supply as shown in FIG. 3 depends on the overall closed loop gain of the feedback loop at the frequency at which the load varies or the input voltage varies. The loop gain cannot be made arbitrarily high without compromising the stability of the feedback loop. Moreover, the input voltage and the impedance of the various elements which make up load 210 typically vary periodically at different frequencies and also are subject to transitory variations. Therefore, it is inherent in this form of regulated supply that some change must occur in the output voltage $V_{out}$ as a function of changes in loading and/or input supply voltage.

In many instances the change in the output loading can be correlated with a change in another independent signal in the system. However, the relationship between the independent signal and the change in load is rarely linear and may change due to interactions of the loads. In a television set, for example, there is a correlation between the incoming video signal and the load presented on the main power supply. Similarly, the load on an audio amplifier correlates in part to the incoming audio signal. It is known to reduce the magnitude of variation in the output of a regulated supply by coupling such a correlated independent signal to the differential amplifier. The idea is to feed forward the independent signal to achieve a needed adjustment in the output of the power supply without waiting for the need for the change to appear as a variation in the level of the regulated output. Examples of such circuits are described in U.S. Pat. Nos. 4,536,700 and 4,809,150.

The limitations of this kind of feed forward approach to power supply regulation as described can be appreciated from the fact that the variation in output level does not exactly and linearly coincide with the variation of the independent signal. Feed forward can only be fully effective if these variables correspond exactly. This form of feed forward regulation is not fully effective because the exact relationship of the output level to other changing variables is neither constant nor readily predicted.

A neural network in a control system can build up over time a series of weight factors representing response of the regulated power supply to the respective load affecting variable(s). The incoming signal for the variable is then sampled and applied to the weight factors defining the response, to provide a calculated feed forward error signal which is used to modify the amount of energy coupled from the power input to the power supply to its regulated output.

A method which can be used to vary the filter weights to optimize regulation is referred to as back propagation and is known in the arts of neural networks and finite impulse response filters. Back propagation refers to a learning rule, not a specific circuit architecture. Generally, however, a back propagation neural network is hierarchical, comprising at least three layers of neurons, also referred to as neurodes. A neuron is a single processing element. In the simplest case, there is an input layer, an output layer and a middle layer. The middle layer is sometimes referred to as the hidden layer, although it is not actually hidden. The input layer must have a buffer element for each of the input signals and the output layer must have a buffer element for each of the output signals. The size of the middle layer can be a matter of design choice and optimization between learning ability and speed of operation. The neurons and layers can be fully connected or selectively connected. When fully connected, every neuron of the input layer is connected to every neuron of the middle layer. Similarly, every neuron of the middle layer is connected to every neuron of the output layer. The neurons of the same layer need not be connected to one another. In operation, a given input results in a certain output, determined by the interconnection pattern of the neurons and the learning rule of the network. The output results in a certain error. The error is propagated back to the middle layer, where the error of each middle layer neuron is computed. The learning rule is then applied to adjust the weight factors before processing the next input. One learning rule, for example the Delta learning rule, is based upon the least means squares, which is a gradient descent learning rule. The term back propagation is sometimes limited to the context of neural networks having more than one middle processing layer, whereas the application of the Delta rule is limited to neural networks having single middle layers. This distinction is of no practical consequence in the context of the inventive arrangements taught herein. Application of a learning rule herein, such as the Delta rule, will be deemed to be an instance of back propagation, insofar as an error signal will be used to adjust the weights of a middle layer in a neural network. Reference may be made to the *Neural Network Primer* generally, and Part III in particular, available from AI EXPERT, Miller Freeman Publications, San Francisco, Calif.

SUMMARY OF THE INVENTION

According to an inventive arrangement, the variation in the output of an energy supply can be adaptively correlated to one or more independent signals to constantly redefine the relationship between variables affecting the load and the variations in load which result therefrom. In a television, the load can vary in a manner indicative of, for example, beam current loading (the variation of the luminance component of a video signal), the variation of an audio signal and/or overall power supply loading.

In accordance with an inventive arrangement, a three layer hierarchical neural network is modeled within the architecture of one or more finite impulse response filters for controlling a system or subsystem in a television, for example a power supply. The conventional feedback error signal from the load energized by a power supply is monitored and utilized in application of the learning rule to adjust the weight factors applied to the input signal to the finite impulse response filter. This is deemed to correspond to back propagation of the error to the middle layer, as described above for the general case. An example of a digital finite impulse response filter including random access memory for storing data samples and filter weights or coefficients, and an arithmetic unit for calculating adjustments to the weights, is the Motorola DSP56200 chip. This chip is a 28 pin HCMOS digital signal processor designed to perform sum of products tasks. Two principal algorithms are implemented on the chip, namely finite sum of products and adaptive least mean squares. The chip has been used for echo cancellation in audio applications such as cancellation of echo in telephone transmissions, especially echo in speakerphone applications. The use of finite impulse response filters in echo cancelling circuits is described, for example, in U.S. Pat. Nos., 3,836,734 and 4,321,686.

It is an inventive arrangement to improve the regulation of a feed forward type voltage regulated power supply by adaptively calculating the relationship of the regulation error to at least one independent signal associated with the load applied to the supply, and applying the calculated correction rather than, or in addition to, the independent signal itself, to modify the feedback loop by which the power supply is regulated. In the context of television, the independent signal can be the input video signal.

A power supply according to an inventive arrangement comprises a circuit for supplying energy from a source to a load, the load having energy requirements which vary in response to an input signal, for example a video signal in a television. A feedback circuit generates a first correction signal indicative of regulation error. A neural network generates a second correction signal indicative of anticipated energy requirement variation by processing information in present values of the input signal. A control circuit, for example a pulse width modulating circuit, is responsive to the correction signals for controlling operation of the energy supplying circuit. The neural network comprises a first signal adaptive circuit for the input signal and a second signal adaptive circuit for a processed version of the input signal. The processed input signal should be linearly independent of the input signal to avoid redundancy in the weight factors. The square root of the input signal, for example, is appropriate for a switched mode power supply. A summing circuit combines outputs of the first and second signal adaptive circuits. A microprocessor can embody the neural network and provide the processed version of the input signal, the microprocessor having an input/output interface for receiving the input signal, for receiving a signal indicative of the regulation error and for generating the second correction signal. The microprocessor can also embody the feedback circuit. The weighting factors can be adjusted responsive to the size and polarity of the regulation error.

DETAILED DESCRIPTION OF THE PREFERRED EMBODIMENTS

Figure 1:
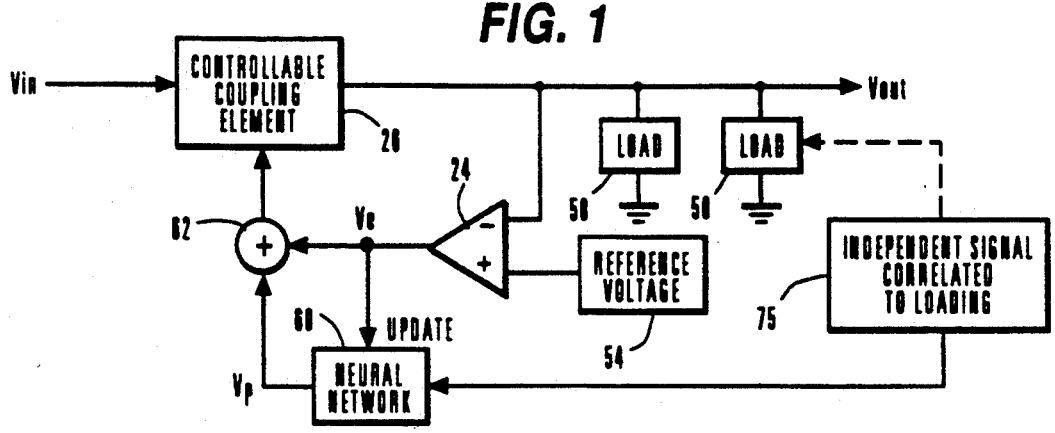
FIG. 1 is a block diagram illustrating the elements of an adaptive feed forward regulated power supply according to the invention.
Figure 2:
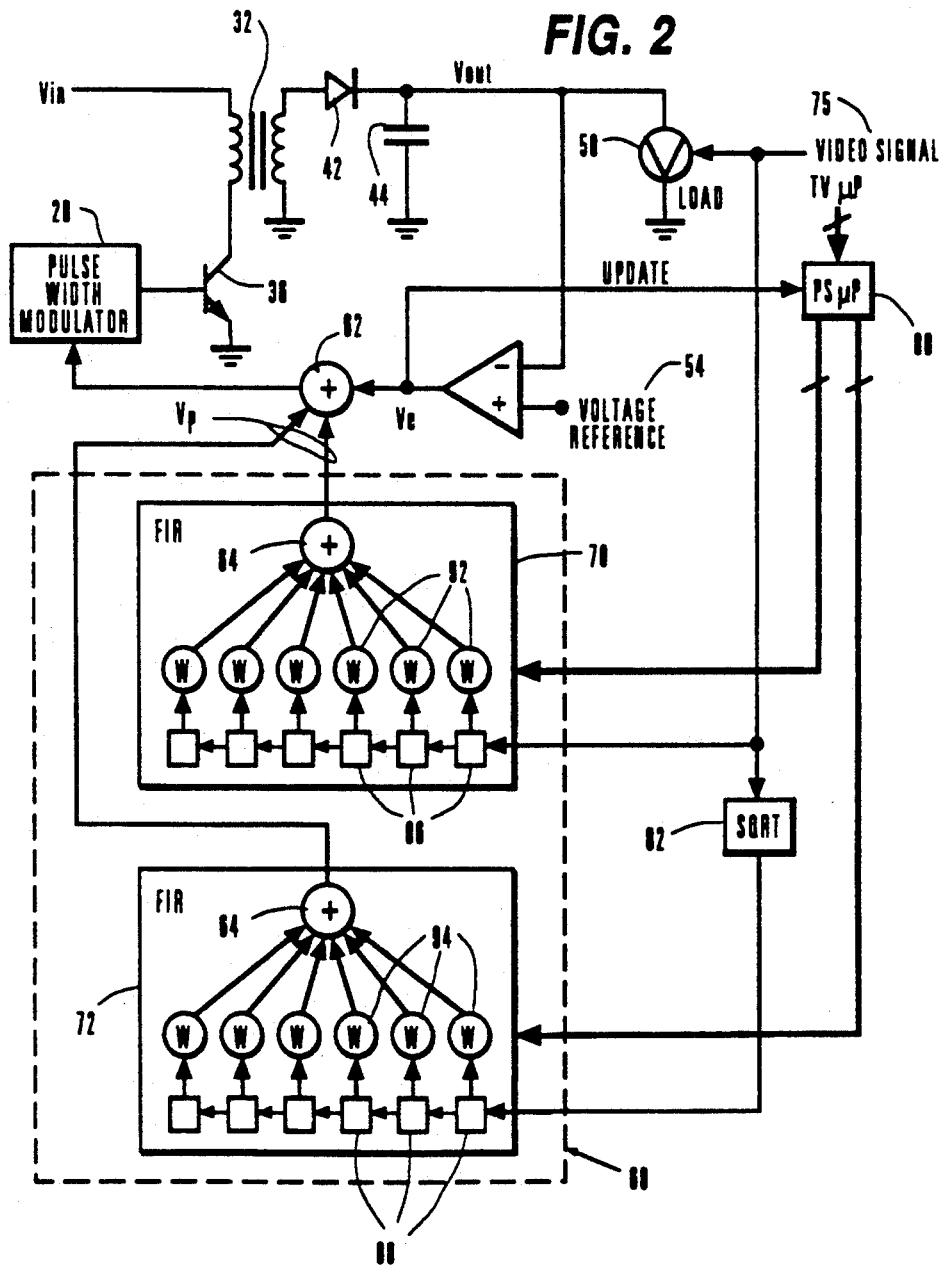
FIG. 2 is a more detailed block diagram of a particular embodiment of the invention, applied to video equipment, with finite impulse response filters responsive to the video signal and to the square root of the video signal.
Figure 3:
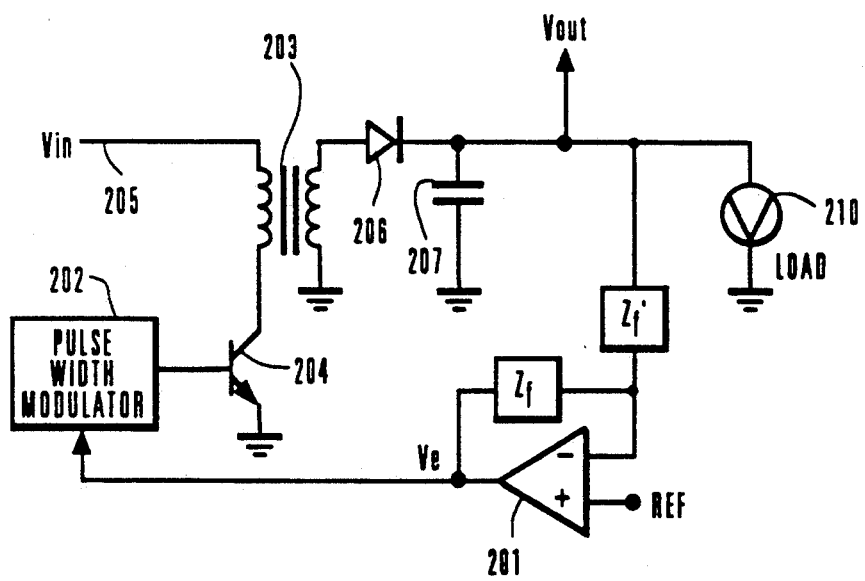
FIG. 3 is a schematic block diagram illustrating a simple voltage regulated power supply according to the prior art; and, FIG. 4 is a schematic diagram illustrating a particular embodiment of the invention as generally illustrated in FIG. 2.

As illustrated in FIG. 1, an adaptive feed forward regulated power supply according to an inventive arrangement includes the elements of a basic regulated power supply as illustrated in FIG. 3. The extent of coupling of energy from the voltage source or input $V_{in}$ to the output $V_{out}$, to which the loads 50 are applied, is controlled using a feedback path including a differential or comparative element such as analog differential amplifier 24. Amplifier 24 generates a first correction signal $V_e$. The loads 50 can vary in their energy requirements in a manner which is indicative changes in a number of differnt input factors. These input factors include, for example, beam current loading (which is generally related to video signal variation), audio output loading, and overall power supply loading. The output $V_e$ of differential amplifier 24 is coupled to a summing junction 62. The summing junction receives at least one additional input, namely the output of one or more neural networks 60 which produce a second, or predictive, error correction signal $V_p$. The neural network 60 may be embodied as one or more finite impulse response filters as shown in FIG. 2. A finite impulse response filter or FIR 70 includes a delay line or shift register 86 which stores a finite number of consecutive samples of the input signal. These samples are scaled by a set of weight factors 92, one per delay line tap, and the weighted sample values are added to produce the output signal of the finite impulse response filter. The values of the weights determine the frequency response of the filter. The second error correction signal is a function of one or more independent signals 75 which are at least partly correlated to the error in regulation. The output of the summing junction 62 is an input to a controllable coupling element 26, for example a pulse width modulator.

Regulation according to the invention is based on both the difference between the output voltage $V_{out}$ and the reference voltage, and the additional factor from the neural network 60 which predicts an error in regulation as a function of the correlated variable. The neural network 60 continuously updates the predicted error based upon recent history by monitoring the output of the differential amplifier as an UPDATE input and thus achieves, over time, an accurate estimation of the particular function by which the error presently correlates to the independent signal, for example the video input. The variation in the output of a regulated supply is adaptively sensed to constantly redefine the relationship between load affecting variables, such as the level of the video signal in a television apparatus, and the variations in load which result therefrom.

The neural network builds up over time a series of factors representing the of the regulated power supply to the respective load affecting variable(s). The incoming signal for this variable is then applied to the factors defining the response, to provide a calculated feed-forward error signal which is used to modify the amount of energy coupled from the power input of the power supply to its regulated output.

A more detailed circuit is shown in FIG. 2. The controllable coupling element is a switched mode power supply, comprising a pulse width modulator 28, a transformer 32, a power switching transistor 36 coupled to the primary winding of transformer 32 and a rectifier circuit, formed by diode 42 and capacitor 44, coupled to the secondary of transformer 32. The primary winding is coupled between the input $V_{in}$ and the collector of transistor 36. The emitter is coupled to ground and the base is coupled to the output of the pulse width modulator. The width of pulses output by the pulse width modulator is varied as a function of the level of the input to the pulse width modulator, thereby applying more or less energy to the primary windings of the transformer 32. The power applied to the secondary windings of the transformer is rectified by diode 42 and filtered by capacitor 44 and applied to the load(s) 50 coupled to the supply. The load(s) 50 may have varying energy requirements as explained in connection with FIG. 1. The inputs to the differential amplifier 24 are coupled respectively to the output $V_{out}$ and to a voltage reference 54, for example a reverse biased Zener diode.

Two distinct finite impulse response filters 70 and 72 can be used, one operating directly on the input video signal and the other operating on a processed version of the input video signal. In the embodiment shown, the square root of the input signal is derived by SQRT circuit 82 and the square root forms the input to the second finite impulse response filter 72. This embodiment is particularly applicable to a regulated power supply for a television set, because the transfer function of the flyback type switched mode power supply includes the square of the error signal. Accordingly, the accuracy of regulation as a whole can be optimized by using the square root of the input signal as well as the signal itself. In other applications of a regulated power supply, other functions whereby the input signal is found to correlate to a regulation error can be used instead of, or in addition to the square root function. The outputs of finite impulse response filters 70 and 72 are inputs to summing junction, representing second and third error correction signals. The output of summing junction 62 is a composite error correction signal, having a component reflection past performance based on feedback signal Ve and components reflecting predicted performance based on the input signal.

The weight factors W (92, 94) associated respectively with shift registers 86 and 88 can be preset, for example based upon operational tests of the equipment under various conditions. Alternatively, the weight factors W for each filter can be supplied by a power supply microprocessor PS $\mu$P 80. The weight factors are adjusted responsive to the error signal $V_e$, which is monitored by the PS $\mu$P 80 as an UPDATE signal. The power supply microprocessor may also be controlled by the main microprocessor of the television, TV $\mu$P, the use of which is becoming more and more common.

Preprocessing the input signal, for example deriving a square root, creates new signals for processing via the finite impulse response filters and improves the extent to which the filter can accurately anticipate the regulation error and feed forward the appropriate correction. However, it is advisable to use preprocessing that produces characterizations of the input signal that are linearly independent in order to avoid redundancy in the weights. Redundancy can cause instability such as oscillation or runaway conditions in the weight values.

Figure 4:
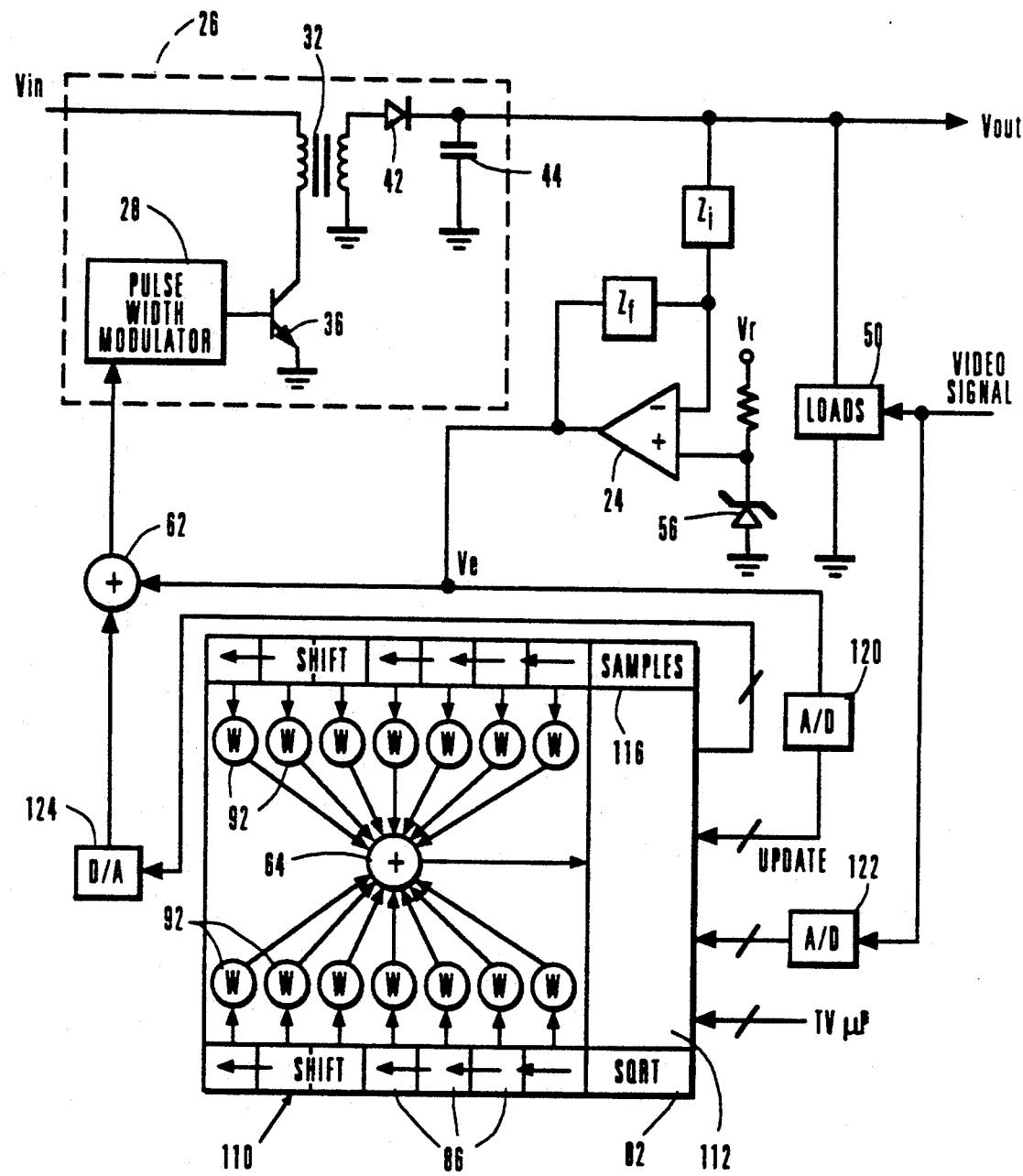

The finite impulse response filters, as well as the weights or factors defining the finite impulse response, can be embodied in a microprocessor 110, as shown in the inventive arrangement according to FIG. 4. The microprocessor 110 can continuously monitor the error signal Ve as an UPDATE signal and monitor the independent input signal as a basis for continuously recalculating the required adjustment of the weights or factors in order to vary the factors in a direction which will minimize the error signal. In this way the filter response tracks the input signal such that the resulting output voltage variation is minimized, even if the particular relationship between the error and the input signal changes over time.

In accordance with an inventive arrangement, a three layer hierarchical neural network is modeled within the architecture of one or more finite impulse response filters. The conventional feedback error signal from the load is monitored and utilized in application of the learning rule to adjust the weight factors applied to the input signal to the finite impulse response filter. Adaptive finite impulse response filters can be controlled by a processor or microprocessor, or even incorporated as part of a microprocessor, as shown in FIG. 4. The delay lines or shift registers 86 and the weight or coefficient factors 92 are mapped and stored in memory of a microprocessor 110. The microprocessor can handle sample data directly with a buffer 116 and/or can derive a numerical function of the samples such as the square root by math processor 82. Samples of the independent signal, for example the video signal, are acquired by use of analog to digital converter 120. Differential amplifier 24 has inputs coupled to the regulated output, $V_{out}$, and to a voltage reference provided by Zener diode 56, which is reverse biased via a series resistor to a voltage source $V_r$. Samples of the error signal $V_e$, which is a first correction signal, are acquired by analog to digital converter 122. The outputs of the analog to digital converters 120 and 122 are coupled to an input/output (I/O) interface 112. The sample data and the square root data, and/or other numerical functions, are stored by processor 110. These functions are indicated generally in FIG. 4 by the designations "SAMPLES" for direct sample data (116) and "SQRT" for numerically processed data (82), in this example square roots of the absolute values of the samples. The samples and square roots can be processed from the raw data provided by the outputs of the analog to digital converters 120 and 122, optionally including preliminary scaling or shifting of the values as well as the calculation of the required numerical function. Alternatively, means apart from the microprocessor 110 can preprocess the data in analog or digital form.

In the embodiment shown, the outputs of the analog to digital converters 122 are coupled to inputs to microprocessor 110, which accomplishes the addressing and arithmetic processing of the sample values and the weights. The storage of samples of the data and the derived function are stored in a succession of shift register stages 86 and 88 respectively, which are coupled to sets of stored weights 92 and 94 respectively. It will be appreciated that this function can be implemented by tables of sample values and weights stored in RAM, which are successively addressed by the processor 110, or an actual shift register can be used. The factors are multiplied by the corresponding weight, the products are summed and the result is added at an internal summing junction 64. The first correction signal provides the path for back propagation of the output error to the middle layer of the neural network. The feed forward value calculated by microprocessor 110 as the sum of the products of the values stored in delay lines cells 86, 88 and the weight in coefficient cells 92, 94 which is a second correction signal, is converted to an analog level by digital to analog converter 124. The output of the digital to analog converter 124 is summed with the error signal Ve at junction 62. The output of summing junction 62 is a composite correction signal which controls pulse width modulator 28.

The weight factors can be recalculated for every data sample or at a different rate. For example, during each cycle of the pulse width modulator 28, which is asynchronous with data sampling, and at a lower frequency, each of the weight factors is adjusted upwardly or downwardly as necessary in the direction that would decrease the error signal Ve. The magnitude of the modification depends on the contribution of the weight being adjusted to the total filter response, the amount of error detected and an arbitrary learning rate that determines how fast the filter must adjust to track the input. Faster learning rates are less stable than slower learning rates, but allow the filter to respond more quickly to decrease residual regulation error.

The weight factors can be adjusted on a sample by sample basis according to the relationship:

$$W_{j+1} = W_j + \frac{a \cdot V_e \cdot X}{E_{X2}}$$

wherein:
$W_{j+1}$ is the new weight;
$W_j$ is the previous weight;
a is the learning rate factor;
$V_e$ is the output of the error amplifier;
$E_{X2}$ is the sum of the squares of the filter inputs; and,
X is the input corresponding to the weight being adjusted.

The calculation of new weights can be performed as often as desired. In the example wherein the filter applies to a switched mode power supply, the weights can be adjusted once for each switching cycle of the power supply. The sampling rate of the input signal can be different from the switching frequency, and in particular is determined based on the frequency content of the independent signal. The sampling rate should substantially exceed the highest frequencies of interest in the independent signal.

Two basic approaches can be taken to implementing the weighted finite impulse response filter. In a less expensive embodiment the weights can be predetermined during design stages of a particular device, for example a particular model of television, including the regulated power supply and certain loads attached thereto. The weights can be chosen, for example, by noting the steady state levels of weights which have been adaptively updated. These weights are then forced into the network as preset constants. Such an approach is acceptable if the operating conditions can be accurately predicted and system characteristics are such as to very repeatable from device to device.

Alternatively, the weights can be continuously updated during operation of the device, for example during every data sample period. In general, the continuous update or training approach will result in improved performance for a given number of finite impulse response filter taps. In an embodiment wherein the weights are updated continuously, the weights can be preset to nominal values to initialize the apparatus, rather than built up from zero over time. The nominal values can also be used to reset the finite impulse response filter in the event a transitory occurrence causes the detected error to become too large.

It is possible to reduce the number of finite impulse response filter taps by examining the operation of a filter over time. After the filter has reached steady state operating conditions, it may become apparent that some of the signals or taps contribute more heavily than others to the filter output. Those signals making a significant contribution can be retained, and those signals which are scaled by relatively small weight factors can be eliminated, without substantial degradation of filter operation.

Figure 5:
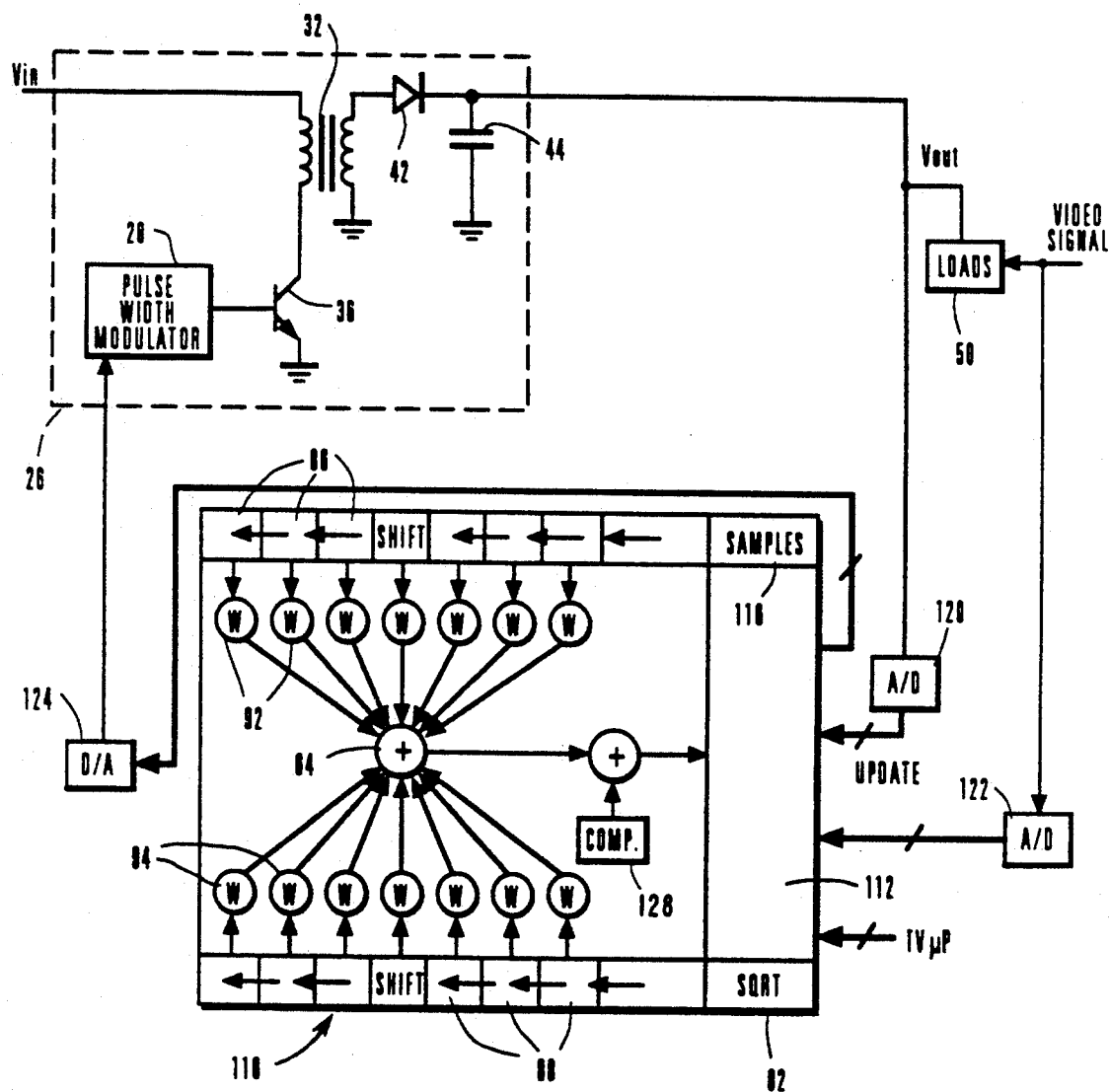
FIG. 5 is a schematic diagram of a variation of the embodiment shown in FIG. 4, wherein the feedback signal is monitored and processed directly by the microprocessor.

The embodiment shown in FIG. 5 is an alternative to the embodiment shown in FIG. 4. The comparator 24 and the associated circuitry has been eliminated in FIG. 5. Instead, the $V_{out}$ signal is a direct input to the analog to digital converter 12. The comparison of this value to a reference value is performed by the microprocessor 110, wherein the reference value can be programmed, or even changed for different modes of operation. The output of the neural network and the output of the reference comparison are also summed by the microprocessor. The output of the microprocessor to digital to analog converter 124 is already the combination of the first and second correction signals. Accordingly, the separate summing circuit 62 is also unnecessary. In all other respects, the embodiment of FIG. 5 operates in the same fashion as the embodiment of FIG. 4.

The invention can be applied to various forms of regulated power supplies, including for example linear power supplies such as series pass, or in other forms of switched supplies such as the high voltage generator typically used in television sets.

What is claimed is:

1. A control circuit for a television, comprising:
   means responsive to first and second correction signals for supplying energy from a source to a load, said load having energy requirements which vary with a video signal;
   means for monitoring past energy requirements and for generating said first correction signal indicative of said past energy requirements; and,
   a neural network, operable in a training mode during operation of said television and responsive to variations of a signal component of said video signal processed during said operation, for anticipating energy requirements and generating said second correction signal indicative of said anticipated energy requirements.

2. The control circuit of claim 1, wherein said neural network is responsive to the luminance component of said video signal for anticipating beam current loading.

3. The control circuit of claim 1, wherein said signal component is the audio component of said video signal.

4. The control circuit of claim 1, wherein said signal component is the luminance component of said video signal.

5. The control circuit of claim 1, wherein said neural network is responsive to the luminance and audio components of said video signal for anticipating power supply loading.

6. The control circuit of claim 1, wherein said neural network comprises a continuously adaptive filter.

7. The control circuit of claim 1, wherein said neural network comprises a finite impulse response filter having continuously updated weighting factors.

8. The control circuit of claim 1, further comprising means for supplying values to said neural network for continuously updating said second correction signal.

9. The control circuit of claim 1, wherein said neural network comprises:
   first means for filtering said video signal component;
   means for processing said video signal component;
   second means for filtering said processed video signal component;
   means for combining outputs of said first and second filtering means.

10. The control circuit of claim 10, wherein said means for processing said video signal component performs a square root function.

11. The control circuit of claim 1, wherein said neural network comprises a microprocessor.

12. The control circuit of claim 11, wherein said microprocessor comprises:
   first means for filtering said video signal component according to a first set of adjustable weight factors;
   means for processing said video signal component;
   second means for filtering said processed video signal component according to a second set of adjustable weight factors;
   means for continuously updating at least one of said first and second set of weight factors in accordance with a learning rule and responsive to said varying energy requirements; and,
   means for combining outputs of said first and second filtering means to define said second correction signal.

13. The control circuit of claim 1, wherein said neural network comprises:
   first means for filtering said video signal component according to a first set of adjustable weight factors;
   means for processing said video signal component;
   second means for filtering said processed video signal component according to a second set of adjustable weight factors;
   means for continuously updating at least one of said first and second set of weight factors in accordance with a learning rule and responsive to said varying energy requirements; and,
   means for combining outputs of said first and second filtering means to define said second correction signal.

14. The control circuit of claim 1, wherein said neural network and said means for monitoring and generating are embodied in a microprocessor.

15. A power supply for a television, comprising:
   means for monitoring a load and for generating a first correction signal indicative of past variation of energy requirements of said load responsive to a video signal;
   means operable in accordance with a learning rule for processing a component of sid video signal for generating a second correction signal indicative of anticipated variation of said energy requirements;
   means for modifying said learning rule during operation of said television; and,
   means responsive to said first and second correction signals for supplying energy from an energy source to said load.

16. The power supply of claim 15, wherein said means for generating said second correction signal comprises a neural network and said learning rule is embodied in a plurality of weighting factors of said network, said weighting factors being continuously updatable during said operation of said television.

17. The power supply of claim 15, wherein said means for generating said second correction signal is responsive to the luminance component of said video signal for anticipating beam current loading.

18. The power supply of claim 15, wherein said signal component is the audio component of said video signal.

19. The power supply of claim 15, wherein said signal component is the luminance component of said video signal.

20. The power supply of claim 15, wherein said means for generating said second correction signal comprises:
- first means for filtering said video signal component according to a first set of adjustable weight factors;
- means for processing said video signal component;
- second means for filtering said processed video signal component according to a second set of adjustable weight factors;
- means for continuously updating at least one of said first and second set of weight factors in accordance with said learning rule and responsive to said varying energy requirements; and,
- means for combining outputs of said first and second filtering means to define said second correction signal.

21. The power supply of claim 15, wherein said means for processing said video signal component performs a square root function.

22. The power supply of claim 15, wherein said means for supplying energy comprises pulse width modulating means.

23. The power supply of claim 15, wherein said source of energy is a voltage source.

24. The power supply of claim 15, wherein said source of energy is a current source.

25. The power supply of claim 15, wherein said means for generating said first correction signal and said means for generating said second correction signal are embodied in a microprocessor.

26. A power supply for a video signal processing apparatus, comprising:
- means for monitoring a load and for generating a first correction signal indicative of past variation of energy requirements of said load responsive to a video signal;
- a neural network operable in accordance with a learning rule for processing a component of said video signal for generating a second correction signal indicative of anticipated variation of said energy requirements;
- means for modifying said learning rule during operation of said video signal processing apparatus; and,
- means responsive to said first and second correction signals for supplying energy from an energy source to said load.

* * * * *